United States Patent
Connell et al.

(10) Patent No.: US 9,753,527 B2
(45) Date of Patent: Sep. 5, 2017

(54) APPARATUS AND METHOD FOR MANAGING GRAPHICS BUFFERS FOR A PROCESSOR IN SLEEP MODE

(71) Applicant: Google Technology Holdings LLC, Mountain View, CA (US)

(72) Inventors: Nathan M Connell, Hawthorn Woods, IL (US); Parikshit Dharawat, Sunnyvale, CA (US); Christian L Flowers, Chicago, IL (US); Jared S Suttles, Mundelein, IL (US); Joseph Swantek, Fox River Grove, IL (US); Haitang Wang, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 455 days.

(21) Appl. No.: 14/339,962

(22) Filed: Jul. 24, 2014

(65) Prior Publication Data
US 2015/0185811 A1    Jul. 2, 2015

(51) Int. Cl.
*G06F 1/32* (2006.01)
*G09G 5/00* (2006.01)
(Continued)

(52) U.S. Cl.
CPC .......... *G06F 1/3265* (2013.01); *G06F 1/3218* (2013.01); *G06F 1/3293* (2013.01);
(Continued)

(58) Field of Classification Search
None
See application file for complete search history.

(56) References Cited

U.S. PATENT DOCUMENTS 7,057,591 B1 * 6/2006 Hautanen ............... G06Q 30/02
                                                      345/211
8,463,333 B2    6/2013 Stuivenwold
(Continued)

FOREIGN PATENT DOCUMENTS

GB       2473015 A      3/2011
WO    2010141878 A1   12/2010

OTHER PUBLICATIONS

International Preliminary Report on Patentability from International Application No. PCT/US2014/072552, mailed Jul. 14, 2016, 12 pp.
(Continued)

*Primary Examiner* — Joni Richer
(74) *Attorney, Agent, or Firm* — Shumaker & Sieffert, P.A.

(57) ABSTRACT

One disclosed method includes registering a graphics buffer with a kernel running on a first processor, storing the registered graphics buffer in memory initially without drawing the graphics buffer to a display, and passing the registered graphics buffer to a kernel display driver directly to draw the graphics buffer to the display, in response to a trigger. The method may further include informing a second processor of the registered graphics buffer and receiving the trigger by the kernel as a message from the second processor. The first processor may receive the trigger as a wake command from the second processor while the first processor is in sleep mode. A partial resume of the kernel is then performed while preventing activation of user space on the primary processor, and the graphics buffer is drawn on the display without using an operating system graphics pipeline of the user space.

18 Claims, 7 Drawing Sheets

(51) Int. Cl.
  *G06T 1/20*      (2006.01)
  *G06T 1/60*      (2006.01)
  *G06F 9/44*      (2006.01)

(52) U.S. Cl.
  CPC .......... *G06F 9/4418* (2013.01); *G06F 9/4443* (2013.01); *G06T 1/20* (2013.01); *G06T 1/60* (2013.01); *G09G 5/003* (2013.01); *G09G 2330/021* (2013.01); *G09G 2330/022* (2013.01); *G09G 2330/026* (2013.01); *G09G 2354/00* (2013.01); *G09G 2360/08* (2013.01); *G09G 2360/18* (2013.01); *Y02B 60/121* (2013.01); *Y02B 60/1242* (2013.01)

(56) References Cited

U.S. PATENT DOCUMENTS

| | | | |
|---|---|---|---|
| 8,467,837 B2 | 6/2013 | Matson et al. | |
| 8,595,529 B2 | 11/2013 | Vangala et al. | |
| 8,766,919 B1 * | 7/2014 | Lachwani | G09G 5/00 345/168 |
| 9,063,731 B2 | 6/2015 | Heo et al. | |
| 2004/0034802 A1 | 2/2004 | Hamilton | |
| 2005/0066209 A1 | 3/2005 | Kee et al. | |
| 2006/0010446 A1 | 1/2006 | Desai et al. | |
| 2008/0016374 A1 | 1/2008 | Gee et al. | |
| 2009/0259865 A1 | 10/2009 | Sheynblat et al. | |
| 2010/0023788 A1 | 1/2010 | Scott et al. | |
| 2012/0054479 A1 | 3/2012 | Park | |
| 2012/0159143 A1 | 6/2012 | Spradlin | |
| 2012/0284550 A1 | 11/2012 | Park | |
| 2013/0078959 A1 | 3/2013 | Reeves | |
| 2013/0318380 A1 | 11/2013 | Behrens et al. | |
| 2014/0089703 A1 | 3/2014 | Starr | |
| 2015/0185811 A1 | 7/2015 | Connell et al. | |
| 2015/0185815 A1 | 7/2015 | Debates et al. | |
| 2015/0277545 A1 | 10/2015 | Flowers et al. | |

OTHER PUBLICATIONS

International Search Report and Written Opinion of international application PCT/US2014/072552, dated Mar. 12, 2015, 15 pgs.

A. Leonard Brown, Rafael J. Wysocki, Suspend-to-RAM in LinuxTM, Proceedings of the Linux Symposium, vol. 1, pp. 39-52 (Jul. 2008) (available at: http://www.linuxsymposium.org/archives/OLS/Reprints-2008/brown-reprint.pdf).

Prosecution History from U.S. Appl. No. 14/339,882, dated from Mar. 21, 2016 through Jan. 17, 2017, 54 pp.

Prosecution History from U.S. Appl. No. 14/339,861, dated from Apr. 22, 2016 through Feb. 24, 2017, 48 pp.

Response to Office Action mailed Jan. 17, 2017, from U.S. Appl. No. 14/339,882, filed Apr. 17, 2017, 6 pp.

Response to Office Action dated Feb. 24, 2017, from U.S. Appl. No. 14/339,861, filed May 24, 2017, 10 pp.

Notice of Allowance from U.S. Appl. No. 14/339,861, dated Jun. 28, 2017, 5 pp.

Notice of Allowance from U.S. Appl. No. 14/339,882, dated Jun. 21, 2017, 5 pp.

* cited by examiner

APPARATUS AND METHOD FOR MANAGING GRAPHICS BUFFERS FOR A PROCESSOR IN SLEEP MODE

CROSS-REFERENCE TO RELATED APPLICATIONS

The present application claims priority to U.S. Provisional Patent Application No. 61/973,187, filed Mar. 31, 2014, entitled "APPARATUS AND METHOD FOR AWAKENING A PRIMARY PROCESSOR OUT OF SLEEP MODE" which is hereby incorporated by reference herein in its entirety, and which is assigned to the same assignee as the present application. The present application also claims priority to U.S. Provisional Patent Application No. 61/921,507, filed Dec. 29, 2013, entitled "DEVICE AND METHOD FOR LOW-POWER AWAKENING OF A PRIMARY PROCESSOR OUT OF SLEEP MODE" which is hereby incorporated by reference herein in its entirety, and which is assigned to the same assignee as the present application.

FIELD OF THE DISCLOSURE

The present disclosure relates generally to low-power operation of a processor in an electronic device, and more particularly to a method and electronic device for bringing a primary processor of the device out of sleep mode for a brief period while minimizing power consumption.

BACKGROUND

A sleep mode for an electronic device allows the device to conserve power, and therefore battery life, without powering off. Contrasted against a normal operating mode for the device, the sleep mode consumes less power but also limits both the operations the device can perform and the user interactions that the device will recognize. The sleep mode and the normal operating mode represent opposite sides of a balance between efficiency and functionality.

Notifications provide information to a communication device user that a message has arrived or that some event has occurred, is occurring or is about to occur. For example, notifications may be displayed on a communication device to indicate calendar events, various alarms, waiting messages, etc. Such notifications may be displayed to the user in various ways. For example, some notifications may be displayed as an icon positioned on some section of the communication device display or by displaying a pop-up message that covers a portion of the display screen and that must be closed by the user by taking some specific action. Notification messages may be generated by various applications resident on a communication device, or may be sent by a network or from the communication device operating system.

DETAILED DESCRIPTION

Figure 1A:
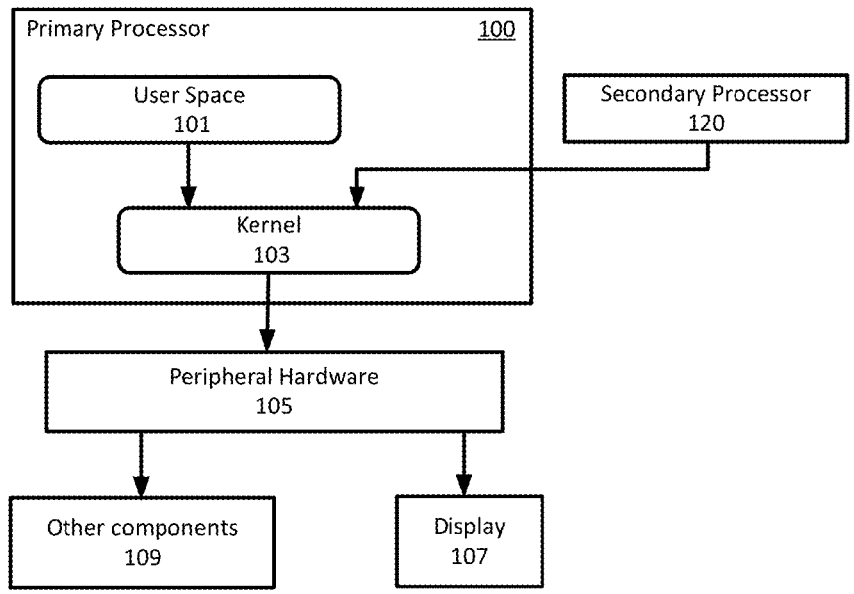
FIG. 1A and FIG. 1B are block diagrams of an example electronic device in which a primary processor and a secondary processor are configured such that the secondary processor may substitute for the primary processor user space and communicate with a kernel to control peripheral hardware.

One aspect of the present disclosure provides an "always-on" display mode (also referred to herein as "AoD" mode) of an electronic device that enables a user to select and view one of multiple notifications or messages. In some embodiments, this mode of operation may include storing message data in multiple data buffers as image data, text data or both. The present disclosure provides methods of operation such that one or more processors of the electronic device may extract and render the image or text data stored in the data buffers, while operating in a low power mode or sleep mode.

One disclosed method includes registering a graphics buffer with a kernel running on a first processor with the kernel including a display driver, storing the registered graphics buffer in memory initially without drawing the graphics buffer to a display, and passing the registered graphics buffer to the kernel display driver directly to draw the graphics buffer to the display, in response to a trigger. The method may also include informing a second processor of the registered graphics buffer, and receiving the trigger by the kernel as a message from the second processor.

In one embodiment, the trigger may be received by the first processor as a wake command from the second processor while the first processor is in sleep mode. The method may then include performing a partial resume of the kernel while preventing activation of user space on the primary processor, and drawing the graphics buffer on the display without using an operating system graphics pipeline of the user space.

A graphics buffer creation trigger may be received by an application in user space of the first processor, and that application may proceed to register the graphics buffer with the kernel in response to the graphics buffer creation trigger. In one embodiment, a buffer creation trigger may be received in response to a notification message where the graphics buffer is related to the notification message. The method may include sending a draw command from the second processor to the kernel running on the first processor, where the draw command contains buffer identification information for the registered graphics buffer.

In one embodiment, the method may include sending an erase command from the second processor to the kernel running on the first processor. The erase command includes buffer identification information for a registered graphics buffer containing a black geometric shape. The method includes drawing the black geometric shape on an area of the display in order to erase the area of the display.

In some embodiments, the method includes detecting user input to a touchscreen display by the second processor where the user input selects a notification message, and sending the wake command from the second processor in response to the user input.

A disclosed example apparatus in accordance with an embodiment includes a display, memory, and a primary processor, operatively coupled to the display and to the memory. The primary processor is operative to run a kernel that includes a display driver, and user space that includes one or more applications. The user space is operative to register a graphics buffer with the kernel and store the registered graphics buffer in the memory initially without drawing the graphics buffer to the display.

The apparatus also includes a secondary processor that is operatively coupled to the primary processor. The secondary processor is operative to pass the registered graphics buffer to the kernel display driver directly to draw the graphics buffer to the display, in response to a trigger. The primary processor may inform the secondary processor of the registered graphics buffer and receive the trigger by the kernel as a message from the second processor.

In one embodiment, the primary processor is operative to receive the trigger as a wake command from the secondary processor while in sleep mode, perform a partial resume of the kernel while preventing activation of user space, and draw the graphics buffer on the display without using an operating system graphics pipeline of the user space.

Another disclosed example apparatus includes a primary processor that is operatively coupled to a touchscreen display and to memory. The primary processor is operative to run a kernel that includes a display driver and user space that includes one or more applications. The user space is operative to register a graphics buffer with the kernel in response to generation of a notification by the one or more applications of the user space and store the registered graphics buffer in the memory initially without drawing the graphics buffer to the display. The primary processor is further operative to perform a partial resume from sleep mode by resuming the kernel while preventing the user space from activating. A secondary processor, which is operatively coupled to the primary processor, is operative to detect user input to the touchscreen display selecting a notification, send a wake command to the primary processor in response to the user input, to initiate the partial resume of the kernel, and pass the registered graphics buffer to the kernel display driver directly to draw the graphics buffer to the touchscreen display, in response to the user input.

The terms "low power mode" or "sleep mode", as used herein, indicate an operational state assumed by an electronic device, or one or more of its components, to conserve power over a normal operating mode. As the electronic device or component enters a sleep mode, it powers down but does not power off. For example, during sleep mode the electronic device may suspend some operations, cut power to some of its hardware components or both, while random access memory (RAM) receives just enough power to maintain the data needed to resume normal operations. Therefore the terms "low power mode" or "sleep mode", as used herein, may refer to situations in which a hardware component is operated with its power or with some operation of the hardware component reduced or suspended, or both. A hardware component may be, but is not limited to, a processor, a display, a transceiver, a sensor, etc.

The term "display" as used herein refers to a device (or "hardware component") that displays "display data" to form an image or images, such as, but not limited to, a picture, text, a desktop background, a gaming background, a video, an application window etc. One example of a display is an integrated display as found in electronic devices such as handheld computing devices, electronic book readers, mobile telephones (smartphones), personal-digital-assistants (PDAs), wearable devices (smart-watches, smart-glasses, etc.). The display may employ any appropriate display technology, such as for example, LCD flat panel, LED flat panel, flexible-panels, etc., and includes other display hardware that may, as needed for a particular electronic device, be operatively coupled to other devices and components. Therefore, the term "display" as used herein may include display hardware such as, but not limited to, a frame buffer, hardware display drivers, etc. that store and refresh display data to be displayed by the "display." Also, a "display" as used herein may include integrated hardware for implementation of touchscreen functionality such that the display is operative to receive user input by touch or via a stylus.

The term "image" as used herein refers generally to what is "displayed" on a display and which may be stored in memory as "display data." That is, an image may be displayed on a display by sending the appropriate display data to the display. Examples of images include, but are not limited to, a background or "wallpaper," a gaming background, a video, an application window, an icon, a widget, etc. In other words, the term "image" may refer to a background, or may refer individually, or collectively, to elements or objects in the foreground, of hovering over, a background image such as wallpaper. The term "display data" is used interchangeably herein with the term "image data" and refers to the information (data, or digital information) that the display interprets and/or decodes to show (i.e. to display) the user an image, as well as any associated elements or objects in the foreground of the background or wallpaper, etc.

Figure 1B:
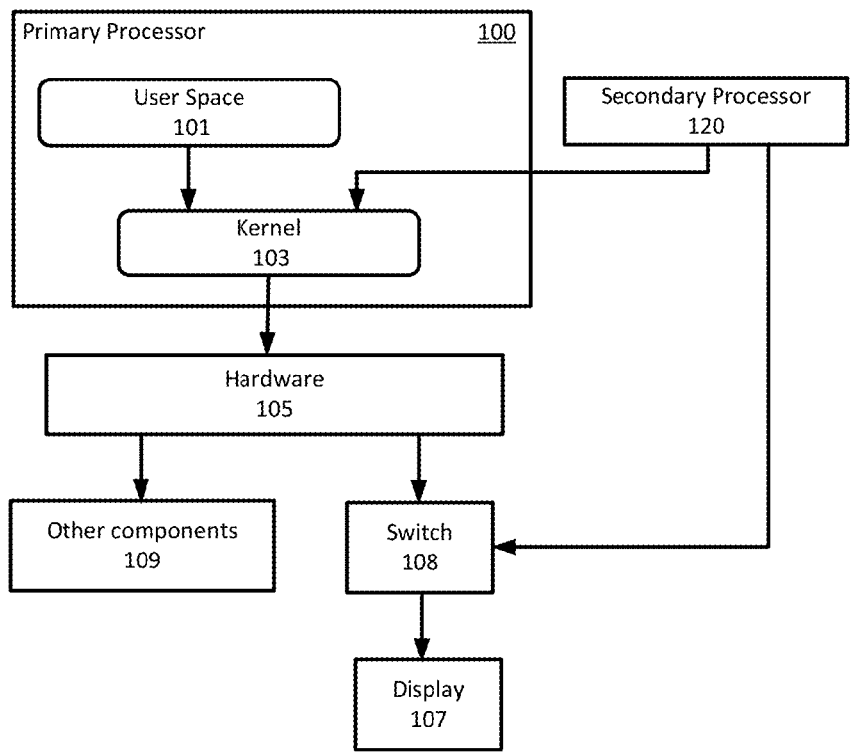

Turning now to the drawings wherein like numerals represent like components, both FIG. 1A and FIG. 1B are block diagrams of an example apparatus in accordance with the embodiments. The example apparatus may be an electronic device such as, but not limited to, a smartphone, personal digital assistant (PDA), portable media player (e.g., an MP3 player), personal computing devices such as tablets, or a wearable electronic device such as a device worn with a wristband (for example a "smart-watch"), etc.

Both example electronic devices include a primary processor 100 that is operatively coupled to a secondary processor 120 and to peripheral hardware 105. The peripheral hardware 105 includes a display 107 and other components 109. The secondary processor 120 is also operatively coupled to the peripheral hardware 105. The primary processor 100 is configured to operate in a sleep mode of operation, with control of certain features and functions of the electronic device being taken over by the secondary processor 120 in order to conserve power or otherwise reduce power consumption. That is, the secondary processor 120 consumes less power to perform certain operations than the primary processor 100 would if placed in its normal operation state and not in sleep mode. In accordance with the embodiments, the primary processor 100 and the secondary processor 120 are configured such that the secondary processor 120 may substitute for the primary processor 100 user space 101 and communicate with the kernel 103 to control functions of the peripheral hardware 105.

The primary processor 100 is operative to execute code (i.e. executable instructions) from memory (not shown) that is operatively coupled to the primary processor 100 and that stores an operating system (OS) as well as the user space and kernel space code. Memory may include memory components that are operatively coupled to the primary processor 100, and to other components in some embodiments, by a communication bus (not shown). Other memory may also be present and may be integrated with the primary processor 100 or with the secondary processor 120, or both.

The term "user space" as used herein refers to code that is executed from an area of memory, collectively, that is separate from an area of memory used for executing the kernel 103 (or "kernel space"). The user space 101 includes, among other things, various applications (also referred to herein as "processes") that are accessible by the electronic device user through a user interface which includes at least the display 107 and various means of user input (such as touchscreen capability of the display 107, input keys, a mouse, touch sensors, etc.). The term "kernel" as used herein refers to code that may be considered to be a central core of an OS, and a controller and manager of applications (i.e. processes) running in the user space 101. For example, the kernel 103 may include most device drivers, among other things, and may provide required OS tasks such as program loading, system resource allocation, handling device input and output (such as for other components 109), and some memory management functions. An application (or "process") within the user space 101 may make a system call to request a service from the kernel 103 and thereby interface with the OS. Kernel 103 services may include, but are not limited to, hardware interaction related services, services related to other applications or processes (such as executing or creating processes), scheduling, memory management, etc.

The memory space allocated to the user space 101 and kernel 103 may be actual segments of physical memory or may be virtual memory allocations (such as active random access memory (RAM) components combined as needed with other physical memory devices, etc.) under control of the kernel 103 or, more generally, the OS. Such functionality of virtual memory is well understood by those of ordinary skill. Therefore the term "memory" as used herein may refer to physical memory or virtual memory.

The primary processor 100 is "primary" as used herein in that it executes the OS for the electronic device where the OS includes, among other things, the kernel 103. The primary processor 100 is also "primary" as used herein in that it executes the user space 101 including one or more applications. The secondary processor 120 is "secondary" as used herein in that it substitutes for the user space 101 and interacts with the kernel 103, as if it were a process running on the primary processor 100, to perform an operation related to the peripheral hardware 105. During the secondary processor 120 control, the primary processor 100 is prevented from fully waking up from a sleep mode of operation. These features are described in further detail herein below with respect to various other drawing figures.

The example apparatus of FIG. 1B represents an embodiment that is similar to that of FIG. 1A with the exception of switch 108. Switch 108 is operative to allow control of the display 107 by only one entity at a time. Specifically, either the secondary processor 120 or the kernel 103 executing on the primary processor 100 can control the display 107 at any particular time depending on the configuration of switch 108. These features are also described in further detail herein below with respect to various other drawing figures.

Figures 2A, 2B, 2C:
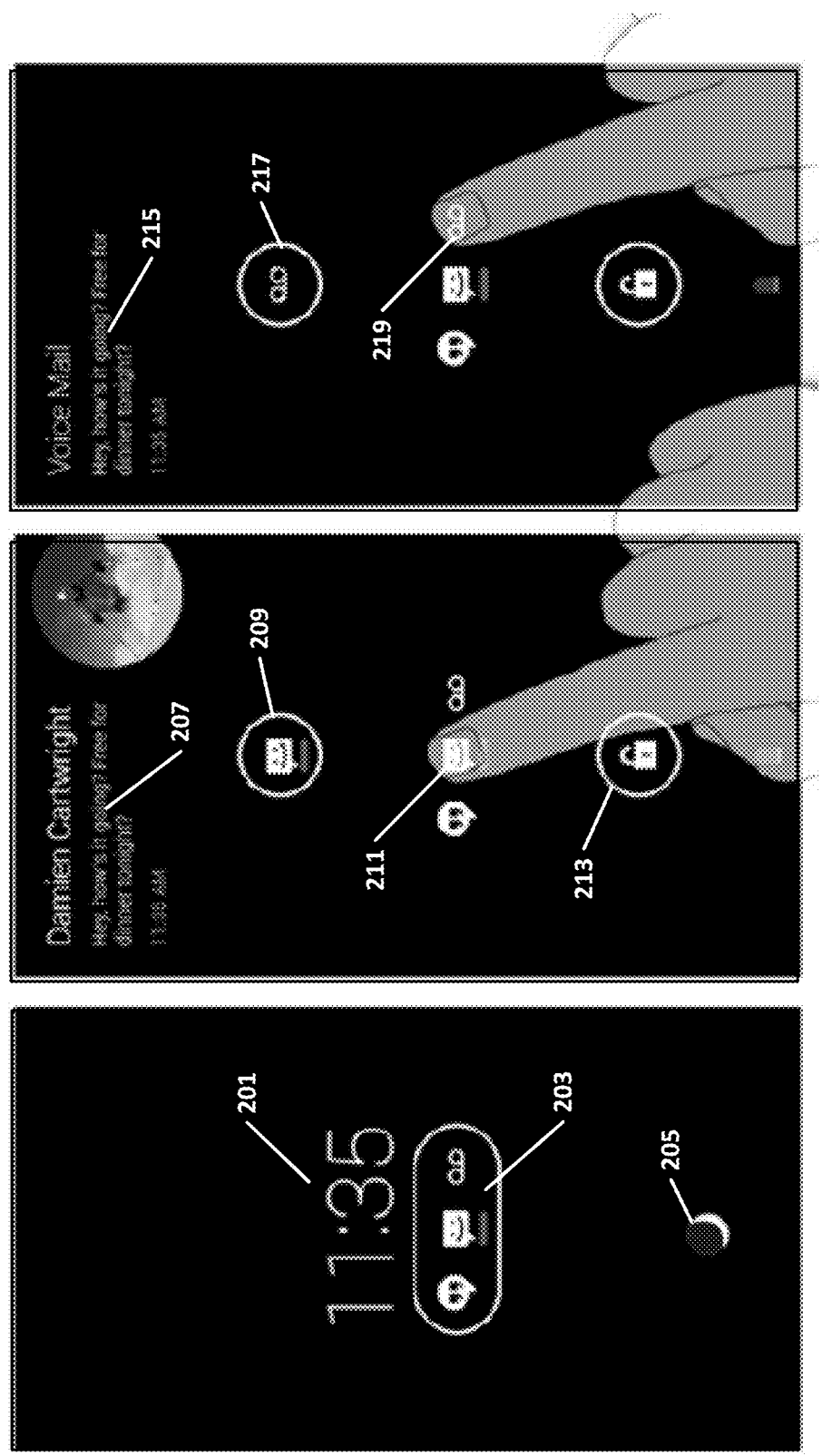
FIGS. 2A, 2B and 2C are diagrams showing sequential display views of a user interface in accordance with an embodiment.

The example electronic devices shown in FIG. 1A and FIG. 1B, and in other drawing figures of the present disclosure, are configured to enable various features and operations in accordance with the embodiments. These features and operations may be understood with respect to an example display illustrated in FIGS. 2A, 2B and 2C. FIGS. 2A, 2B and 2C are diagrams that show sequential display views of a user interface display in accordance with an embodiment. FIG. 2A illustrates a display state that may occur when the electronic device is in a sleep mode of operation. More particularly, FIG. 2A illustrates a "breathing" feature that may be enabled during sleep mode. The breathing feature temporarily lights up at least a portion of the display, on a predetermined schedule or in response to a user interaction, to show some information such as a clock 201, multiple notification/information icons 203 and activity indicator 205. The clock 201 displays the current time and the multiple notification/information icons 203 enable a user to obtain more information about various notifications by touching an appropriate icon within the multiple notification/information icons 203.

In accordance with the embodiments, the user may obtain information about multiple notifications and their respective contents by using the various disclosed features. Among other advantages, the features described in the present disclosure provide the user with a rich experience in changing display views, while maintaining low-current drain on the electronic device battery. For example in FIG. 2B, a user may place their finger on one of the icons of the multiple notification/information icons 203 and may swipe their finger from one icon to another to change the display view. In FIG. 2B, the user has placed their finger on a message icon 211 and, in response, notification information 207 is displayed near the top of the display, along with an indicator 209 that shows the selected message icon 211. In FIG. 2C, the user has selected the voicemail icon 219, either by sliding their finger on the display to the icon or by touching the specific area of the icon and, in response, notification information 215 is displayed near the top of the display, along with an indicator 217 that shows the selected voicemail icon 219. The display may also display a lock status icon 213 that emulates a power key press to turn the device on fully. In some embodiments, the user's ability to access the display views described above may be dependent upon user settings that either enable or disable viewing notifications when the display is locked. In other words a password may be required to unlock the screen.

The present disclosure uses various terms that correspond and refer to the various features and operations described above with respect to FIGS. 2A, 2B and 2C, and to help facilitate their description. These terms will now be described in the context of embodiments in which an electronic device includes a display (such as display 107) with touchscreen functionality. The touchscreen functionality of the display 107 enables the display 107 to send user input information to the primary processor 100, to the secondary processor 120, or both.

The term "Peek" as used herein refers to an operation in which a user may select a notification using the touchscreen and is shown, in response, an appropriate display "peek" which provides further information about the notification by displaying the notification information in a specific portion of the display. FIG. 2A and FIG. 2B, which were described above, illustrate examples of the Peek operation.

The term "Draw" as used herein refers to an operation in which a portion of display data is updated such that a specific portion of the display may display the updated portion of display data. A Draw operation may occur in response to, or in conjunction with, a Peek operation. The Draw operation may be facilitated by the secondary processor 120 emulating the user space 101 of the primary processor 100. The Draw operation also involves a display driver, within the kernel 103, for performing the partial display data update. The display driver may be used to update only small parts of the display on request, while leaving the rest of the display untouched.

The term "Wake" as used herein refers to an operation that enables another operation, such as a Peek operation, when the kernel is suspended, while minimizing latency and current drain impact. A Wake operation performs a resume of only the necessary kernel drivers in order to perform the other operation, such as the Peek operation, executes the operation, and then returns the kernel to suspend mode without ever fully resuming.

In some embodiments, the Wake operation utilizes an interface on the "platform_suspend_ops" structure called "suspend_again." When the electronic device is woken from suspend, a function is called to determine whether to fully resume the electronic device (i.e. fully wake up from a sleep mode), or whether the electronic device should drop back into suspend mode. Example code for this operation is the following:

```
do {
    error = suspend_enter(state, &wakeup);
} while (!error && !wakeup
    && suspend_ops->suspend_again &&
    suspend_ops->suspend_again( ));
kernel/kernel/power/suspend.c
```

In accordance with the embodiments, a function is defined to enable performing an operation and then dropping back into suspend mode. Example code for this operation is the following:

```
/* returns: 1 - suspend again 0 - continue resuming */
static bool msm_pm_suspend_again(void)
{
    int ret = 0;
    if (wakeup_check( ))
        ret = wakeup_execute( );
    pr_debug("%s returning %d %s\n", __func__, ret,
        ret ? "suspend again" : "wakeup");
    return ret;
}
kernel/arch/arm/mach-msm/pm-8x60.c
```

Figure 3:
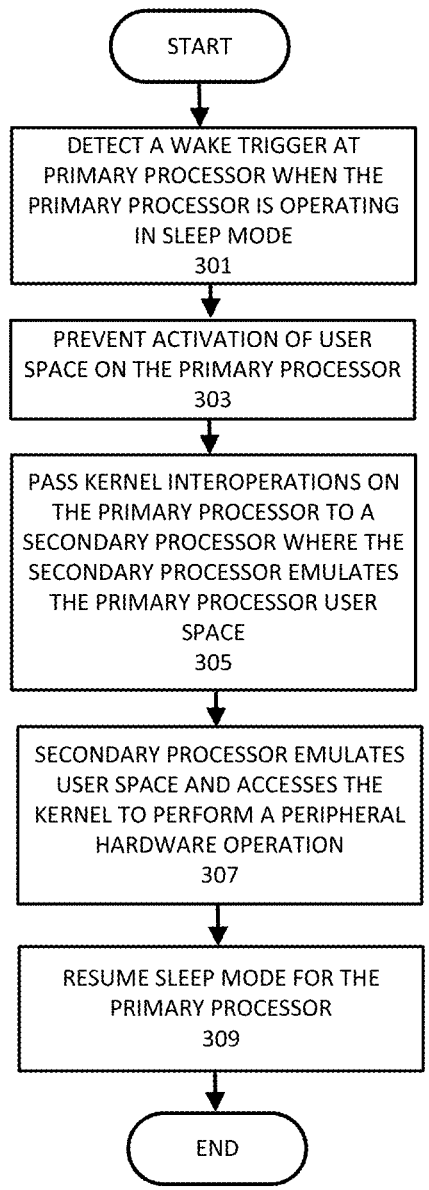
FIG. 3 is flowchart showing a method of operation of an electronic device having a primary processor and a secondary processor in which the secondary processor substitutes for user space of the primary processor.

FIG. 3 provides further details of operation in an example apparatus such as shown in FIG. 1A or FIG. 1B. In the flowchart of FIG. 3, the method of operation begins when the primary processor 100, operating in sleep mode, detects a wakeup trigger as shown in operation block 301. In operation block 303, activation of the user space 101 on the primary processor 100 is prevented. In normal operations, a wakeup trigger would cause the primary processor 100 to fully awaken such that the user space 101 is fully activated along with the kernel 103. However, in accordance with the embodiments, the user space 101 is prevented from fully activating. In operation block 305, the primary processor 100 passes control and interoperation with the kernel 103 to the secondary processor 120 such that the secondary processor 120 may request kernel 103 operations. In operation block 307, the secondary processor 120 substitutes for the user space 101 and accesses the kernel 103 to perform a peripheral hardware 105 operation. The peripheral hardware 105 operation may involve an operation of the display 107 (such as updating display data to display an image) or an operation related to one or more of the other components 109. After the hardware operation is completed, the primary processor 100 may resume sleep mode by suspending the kernel 103 as shown in operation block 309.

Figure 4:
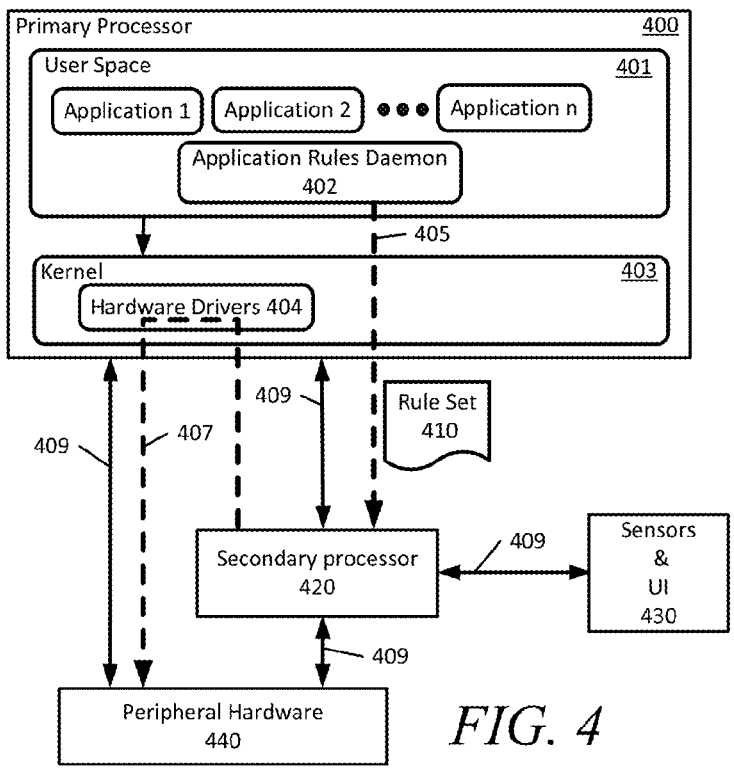
FIG. 4 is block diagram of an example electronic device in which a primary processor is configured to send a rule set to a secondary processor such that the secondary processor may substitute for an application within the user space of the primary processor.

Turning to FIG. 4, another example apparatus is shown in which a primary processor 400 is configured to send a rule set 410 to a secondary processor 420 to enable the secondary processor 420 to substitute for an application within the user space 401 of the primary processor 400. The primary processor 400 is operatively coupled to a secondary processor 420, and to peripheral hardware 440, by one or more communication buses 409. Likewise the secondary processor 420 is operatively coupled to sensors and a user interface (UI) 430, and to peripheral hardware 440, also using the one or more communication buses 409. In accordance with the embodiment illustrated by FIG. 4, any one of a number of applications (or "processes"), such as application 1 through application "n", within the user space 401 may generate a rule set 410 and communicate the rule set 410 to the secondary processor 420. The user space 401 includes an application rules daemon 402 that may be called by any of the applications within the user space 401 to generate and transmit the rule set 410 to the secondary processor 420 using the protocol 405. The rule set 410 is sent to the secondary processor 420 over the one or more communication buses 409 using the protocol 405.

Figure 5:
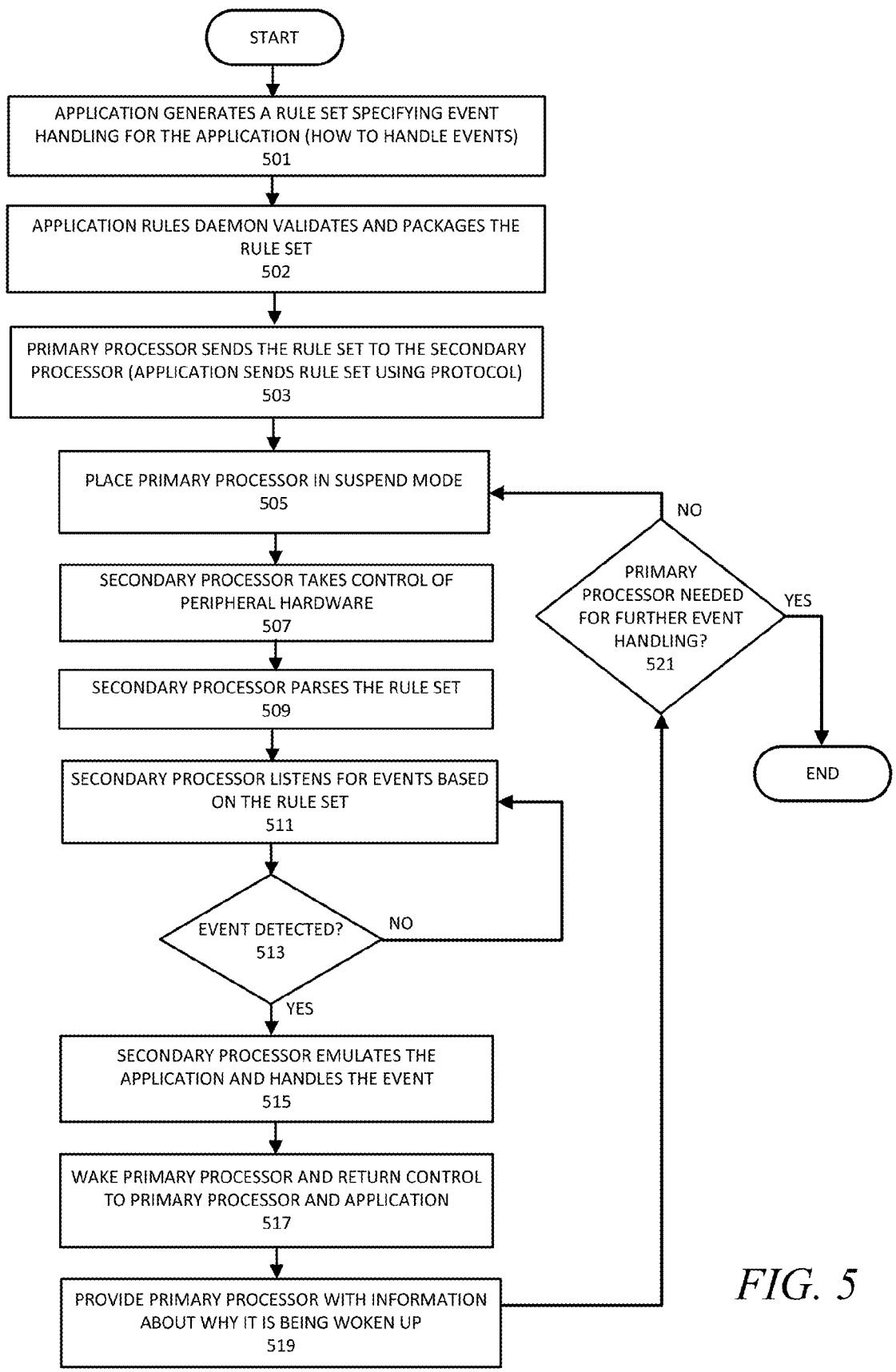
FIG. 5 is a flowchart showing a method of operation of an electronic device having a primary processor and a secondary processor in which the primary processor sends a rule set to the secondary processor.

The secondary processor 420 is operative to wake the primary processor 400 from sleep mode. This is accomplished when the secondary processor 420 sends a wake up signal to the primary processor 400 in response to certain trigger conditions. In accordance with the embodiments, the secondary processor 420 receives the rule set 410 and uses it to determine what information to provide to the primary processor 400, and how the information should be formatted, in response to a given trigger condition. A wake up trigger condition may be generated from any number of sources. In particular, trigger conditions may be generated by inputs received by the sensors and UI 430. FIG. 5 provides further details of operation in an example apparatus such as shown in FIG. 4.

In the flowchart of FIG. 5, the method of operation begins in operation block 501 when an application in the user space 401 generates a rule set 410 corresponding to event handling by that particular application. The rule set 410 specifies how events should be handled and a format for sending event related information back to the application. In operation block 502, the application rules daemon 402 validates and packages the rule set 410 and, in operation block 503, the application sends the rule set 410 from the primary processor 400 to the secondary processor 420 using the protocol 405.

In operation block 505, the primary processor 400 is placed into sleep mode (or suspend mode) and, in operation block 507, the secondary processor 420 takes control of the peripheral hardware 440 which may include a display. In operation block 509, the secondary processor 420 parses the rule set 410 and, in operation block 511, listens for events based on the rule set 410. When an event corresponding to the application is detected in decision block 513, the event is handled by the secondary processor 420 in operation block 515. That is, the secondary processor 420 follows the rule set 410 to substitute for the application while the primary processor 400 user space 401 remains in a sleep mode. In operation block 517, the secondary processor 420 may wake the primary processor 400 and return control. However, as shown in operation block 519, the secondary processor 420 will also provide the primary processor 400 with information related to the wake-up event in accordance with the specifications of the rule set 410. In response to the information sent in operation block 517, the primary processor 400 may either fully awaken and thereby fully activate the user space 401, or may return to suspend mode wherein the secondary processor 420 continues to perform certain operations. That is, in decision block 521, if the primary processor 400 is needed to further handle the event, then the primary processor 400 proceeds to activate the user space 401 and the method of operation ends as shown. However, if the primary processor 400 is not needed in decision block 521, then the method of operation may return the primary processor to suspend mode in operation block 505 and the secondary processor 420 may again take control of the peripheral hardware 440. Otherwise, the method of operation may begin again based on the same or another application generating a new rule set.

In one specific example related to the operations illustrated in FIG. 5, an email application of the user space 401 may receive an email and generate a notification. Another application of the user space 401 related to the AOD feature (always-on-display) is an application that handles display of the notification. In accordance with the embodiments, the AOD application may generate a rule set that specifies how to handle a data buffer. That is, the AOD application will render a buffer, register it, and communicate to the secondary processor 420 that if the user touches the display (i.e. provides a touchscreen input), a Peek operation should be performed. Based on the generated rule set, the secondary processor 420 will take over for the AOD application while the primary processor 400 operates in a sleep mode.

Therefore, in the example embodiment illustrated in FIG. 4, the primary processor 400 sends a rule set 410 to the secondary processor 420 using one of the one or more communication buses 409 and the protocol 405. The rule set 410 specifies how the secondary processor 420 should respond to user interaction events such as user inputs received from the touchscreen features of the display. The secondary processor 420 follows a sequence of operations specified in the rule set 410 in response to detecting events such as, but not limited to, user inputs. The generation of the rule set 410 by an application takes place without the electronic device user's knowledge or input. From the user's viewpoint, the electronic device will appear to continue to operate as if the user is still interacting with the application corresponding to the rule set 410.

In order for the secondary processor 420 to take over control from an application using a rule set 410, the application must be in a state in which a set of predetermined events can occur or be executed. In other words, the application must be in a somewhat "static" state where a given set of predetermined actions can be performed with respect to the application. As an example of a "static" state with respect to an email application, the email application may show a list of email messages in a user interface window on the display. At that point, the user may take one of a limited number of actions such as a) exit the application, b) delete an email message or c) select an email message to display. The email application therefore has a limited number of possible "events" (i.e. event "a", "b", or "c") that can occur or be executed from the email application's current state. The email application may therefore send a notification which results in a call of the application rules daemon 402, which will then generate a set of rules that define those events (i.e. user actions that may be taken during the current state) and specify what actions the secondary processor 420 should take in response to detecting one of those events. If it is no longer necessary for the email application to remain active (and if no other applications remain active), then the primary processor 400 may go into sleep mode (or "suspend" mode) which will, in turn, pass control to the secondary processor 420 so that it may execute the rule set 410 and perform the specified response actions. For example, one of the response actions that may be specified for the secondary processor 420 may be to wake the primary processor 400 and return control to the user space 401 application.

The rule set 410 uses a format and rule syntax suitable for interpretation by the secondary processor 420. To accomplish this, an application may call the application rules daemon 402 which may provide, among other things, a table of commands for the secondary processor 420 and a list of states that the secondary processor 420 can be requested to act upon. The application rules daemon 402 may also package any required state information along with, or subsequent to, the rule set 410 and send that information to the secondary processor 420 using the protocol 405. The protocol 405 is defined between the user space 401 of the primary processor 400 and the secondary processor 420 and facilitates communication of an application's behavior to the secondary processor 420. Any of the various applications in the user space 401 may make use of the protocol 405 and the application rules daemon 402.

Among other advantages, the application rules daemon 402 and the protocol 405 enable handling of events related to one or more applications in the user space 401 by the secondary processor 420 while the primary processor 400 operates in a sleep mode (or suspend mode). This results in lower current drain on the electronic device battery.

In some embodiments, the application rules daemon 402 provides a table that defines a set of inputs from one or more sensors, one or more user interface inputs, or various combinations thereof, that may be obtained from sensors and UI 430. The table also defines a number of rules for actions that may be taken upon those inputs by the secondary processor 420. These rules may be selected and arranged by an application, using the application rules daemon 402, according to the application's specific requirements. The secondary processor 420 may thus be used by an application to run various algorithms based on sensor input or user inputs. The result is that the user is provided with an appearance that the application is actually performing in response to the inputs when in fact the actions are performed by the secondary processor 420. In other words, by following the rule set 410, the secondary processor 420 substitutes for the application and performs certain application actions as specified by the rule set 410.

In some embodiments, multiple applications may generate rule sets for execution by the secondary processor 420. The secondary processor 420 may provide emulation on a first-come-first-served basis to avoid conflicts. Also, as mentioned above, the application rules daemon 402 may provide a table that defines a set of inputs from one or more sensors, one or more user interface inputs, or various combinations thereof, that may be obtained from sensors and UI 430. Therefore, the secondary processor 420 may be configured by the rule set 410 to respond to an "event" that is defined as occurring based on multiple sensor inputs, multiple user interface inputs, or some combination thereof. Additionally, "events" may be defined as requiring a predetermined sequence of inputs in order to trigger a response by the secondary processor 420.

As one example of a rule set from an application managing a display, a rule set 410 may specify one event as detection of a touchscreen user input at a specific area of the touchscreen (i.e. a touchscreen display). The rule set 410 may instruct the secondary processor 420 to modify the lighting around the display's touched area by a certain lux percentage in response to detection of the input event. In other examples, the rule set 410 may specify a response action based on sensor input indicating changes in the electronic device's spatial orientation, surrounding ambient light or ambient sound, or any other change that may be detected by the electronic device's sensors. For example, the secondary processor 420 may be instructed by the rule set 410 to turn the display on when the user takes device out of their pocket and to turn the display off when the user puts the electronic device back in their pocket, based on detection of various sensors. The rule set 410 may also instruct the secondary processor 420 when to enable or disable certain sensors based on inputs from other sensors or from user input. In another example, the rule set 410 may instruct the secondary processor 420 to redraw an area of the display with a new image based on the time, more specifically redrawing the clock to show the correct time.

In another example, the specific action may be for the secondary processor 420 to wake the primary processor 400 in response to the occurrence of multiple events occurring individually or simultaneously or closely spaced in time (such as within a few milliseconds). For example the rule set 410 may instruct the secondary processor to wake the primary processor 400 in response to detection of a touch input at specified points on the touchscreen display. In addition to waking the primary processor 400, the secondary processor 420 will also inform the primary processor 400 of any actions that have been taken by the secondary processor 420 (such as what was drawn to the display etc.) so that the primary processor 400 can resume control from the correct state. This state information may be sent by the secondary processor 420 to the primary processor 400 using the protocol 405 and may be sent, for example, as a table of information.

An example implementation of the protocol 405 will now be described further with respect to one example embodiment in which a display panel is controlled. The display panel is one part of the peripheral hardware 440 shown in FIG. 4. In the example embodiment, the one or more communication buses 409 may include or may be implemented using an inter-integrated circuit ("I$^2$C") bus. It is to be understood however, that the one or more communication buses 409 may be implemented using other suitable connection technologies such as, but not limited to, Serial Peripheral Interface (SPI), Universal Asynchronous Receiver/Transmitter (UART), controller area network (CAN), or by using portpins in some embodiments, or using some other suitable connection technology. Therefore, I$^2$C is discussed only with respect to providing an example. Also in the example embodiment, the kernel 403 includes various hardware drivers 404 for, among other things, the peripheral hardware 440. The hardware drivers 404 include a secondary processor 420 driver that communicates with the secondary processor 420 using the I$^2$C bus such that control of certain peripheral hardware 440 may be handed back and forth between the primary processor 400 and the secondary processor 420. Control may be handed over to the secondary processor 420 in order to facilitate a hardware operation 407 that may be performed using the kernel 403 and any needed driver of the hardware drivers 404. In one example, a hardware operation 407 may involve performing partial display updates that are performed to enable a Peek operation as described with respect to FIG. 2A and FIG. 2B. More particularly, during a Wake operation, the kernel 403 performs a partial resume of only the necessary hardware drivers 404 in order to communicate over the I$^2$C bus with the secondary processor 420 to perform any needed hardware operation 407 such as, but not limited to, performing partial display updates. Therefore, a wake trigger received by the primary processor 400 is evaluated to determine whether a full resume is necessary or whether a partial resume of only the kernel 403 can fulfill the request of the specific wake trigger source. For example, a Wake operation, described herein in detail, is only used in a Peek operation to respond to a "peek" request that occurs when the kernel 403 is in full suspend. A partial resume of the kernel 403 is invoked to respond to the Wake operation wake trigger or wake command while the user space 401 is suppressed from activation. In some embodiments, a Draw operation may be implemented as a mechanism in a display driver (within the kernel 403) that is used to perform, for example, partial display updates. The display may be considered to be part of the peripheral hardware 440 which is operatively coupled to the secondary processor 420 by the one or more communication buses 409 which may include a display data bus for the display. In the various embodiments, a Peek operation may be considered to be a protocol 405 mechanism by which the secondary processor 420 and the kernel 403 communicate in order to perform a Draw operation. The Draw operation and the Wake operation may be considered child operations of a Peek operation.

In the protocol 405 example under discussion, all I$^2$C communication between the kernel 403 and secondary processor 420 is accommodated using a set of secondary processor 420 registers. For example, a "WAKE_STATUS" register may be used to pass commands being sent from the secondary processor 420 to the kernel 403 secondary processor 420 driver. A "PEEKDATA_REG" register may serve as a payload register for data that is sent from the secondary processor 420 to the kernel 403 secondary processor 420 driver. A "PEEKSTATUS_REG" register may serve as an acknowledgment ("ACK") register for data that is sent from the kernel 403 secondary processor 420 driver to the secondary processor 420. A "STATUS_REG" register may serve as a general secondary processor 420 status register. For example, the STATUS_REG contents may indicate that the secondary processor 420 is active and may indicate the current display panel state. That is, various bit states may be used to indicate display panel states such as, for example, "Display Off," "Sleep Out;" "Display On," "Sleep Out;" "Display Off," "Sleep In;" and "Display On," "Sleep In (INVALID)."

The protocol 405 over the I$^2$C bus may include communication using various commands. As an example, a "Peek-Prepare" command of the protocol 405 may be implemented as a message from the secondary processor 420 to the kernel secondary processor 420 driver to kickoff a Draw operation. When the kernel 403 receives a PeekPrepare message, the kernel 403 takes physical control of the display panel and the secondary processor 420 is no longer able to communicate with the display panel. In response to the PeekPrepare command, the kernel 403 will read the display panel status and if the status is not correct, the panel will be recovered and the secondary processor 420 is notified using the "STATUS_REG" register. In one detailed example of the register states that may occur in conjunction with a PeekPrepare command, the WAKESENSOR_STATUS register may store a value corresponding to Wake; the STATUS_REG register will have the display panel state and the PEEKSTATUS_REG register will store the Kernel 403 ACK with the status result of the command.

In another example, a "Draw" command of the protocol 405 may be implemented as a message from the secondary processor 420 to the kernel secondary processor 420 driver specifying which bufferID to Draw onto the display panel. A region of the display panel screen to be drawn on is also defined and may be the entire display panel screen or a small portion of it such as, for example, two pixels high by eight pixels wide, or some other size. The kernel 403 will copy a buffer associated with the specified bufferID onto the display panel screen. In one detailed example of the register states that may occur in conjunction with a Draw command, the WAKESENSOR_STATUS register may store a value corresponding to the Draw command; the PEEKDATA_REG register will store a payload representing the bufferID (i.e. 0x05); the PEEKSTATUS_REG register will store the Kernel 403 ACK with the status result of the command. As a specific example the PEEKSTATUS_REG register may have a flag bit indicating if the requested buffer was drawn successfully where a "0" indicates that the buffer was drawn successfully and a "1" indicates that the buffer was not drawn and that an error occurred. The requested bufferID may be included in the PEEKSTATUS_REG register to help synchronized commands between secondary processor 420 and the kernel secondary processor 420 driver.

In some embodiments, an "Erase" command of the protocol 405 may be implemented as a message from the secondary processor 420 to the kernel secondary processor 420 driver specifying a rectangle section of the panel to erase to black. Such erasures may be facilitated by the Draw command in that the secondary processor 420 may, in the PEEKDATA_REG register payload for the Draw, specify that instead of drawing a specified buffer content to the display panel memory, the portion of the display panel would instead be blacked out by a specified rectangle section, in other words, wiping the peek area to all black. Therefore, in such embodiments, an Erase command message may not be defined, or may make use of the Draw command as described above.

In another example, a "Complete" command of the protocol 405 may be implemented as a message from the secondary processor 420 to the kernel 403 secondary processor 420 driver indicating that no more Draws are being requested and that the Draw operation sequence can be completed. When the kernel 403 receives a "Complete" command message, the kernel 403 returns physical control of the display panel to the secondary processor 420 such that it has control and is able to communicate with the display panel to perform various operations such as, for example, draw, brightness control, etc. Therefore, in response to the Complete Command message, the kernel 403 performs a cleanup and returns control of the display panel to secondary processor 420. In one detailed example of the register states that may occur in conjunction with a Complete command, the WAKESENSOR_STATUS register may store a value corresponding to the Complete; the PEEKDATA_REG register will have no payload (i.e. null or "don't care"); the PEEKSTATUS_REG will store the kernel 403 ACK with the current panel state. The low byte may indicate the panel state in the same way as described previously above (i.e. the panel state indicated may be "Display Off," "Sleep Out;" "Display On," "Sleep Out;" "Display Off," "Sleep In;" or "Display On," "Sleep In (INVALID)").

In the present protocol 405 example, after the kernel 403 has been sent a Draw command the secondary processor 420 will no longer have physical control of the display panel. The secondary processor 420 will not regain control of the display panel until the kernel 403 is sent a Complete command and the kernel 403 responds with an ACK of that command message. Therefore, if the secondary processor 420 detects a "liftoff" (i.e. detects that the user has lifted their finger off of the display panel and has thereby aborted the peek operation) or detects some other reason to cancel the Draw operation, then the secondary processor 420 must send a Complete command message and wait for the kernel 403 to reply with an ACK of that command message.

In the present example of the protocol 405, a Complete command is handled at a higher priority than the Draw command. Therefore, if both are received at the same time, the Complete command will take precedence and the Draw command will be ignored.

In some embodiments, if while the kernel is waiting for a Complete or Draw message and the kernel 403 times out (i.e., for example, 1 second) then the kernel 403 may populate the PEEKSTATUS_REG register as if a Complete message was received. However, in an alternative embodiment, the kernel 403 may assume that the secondary processor 420 is not expecting a message and do nothing. The secondary processor 420 may also, in the PEEKDATA_REG register payload for the Draw command specify that instead of drawing the buffer contents to the display panel memory, the portion of the display panel would instead be blacked out, in other words, wiping the peek area to all black (similar to implementation of the Erase command message described above). Also, in some embodiments, if secondary processor 420 makes a Draw request using a bufferID that is invalid or is otherwise not recognized by the kernel 403, then the ACK sent back by the kernel 403 will have a bit set indicating a failure.

Figure 6:
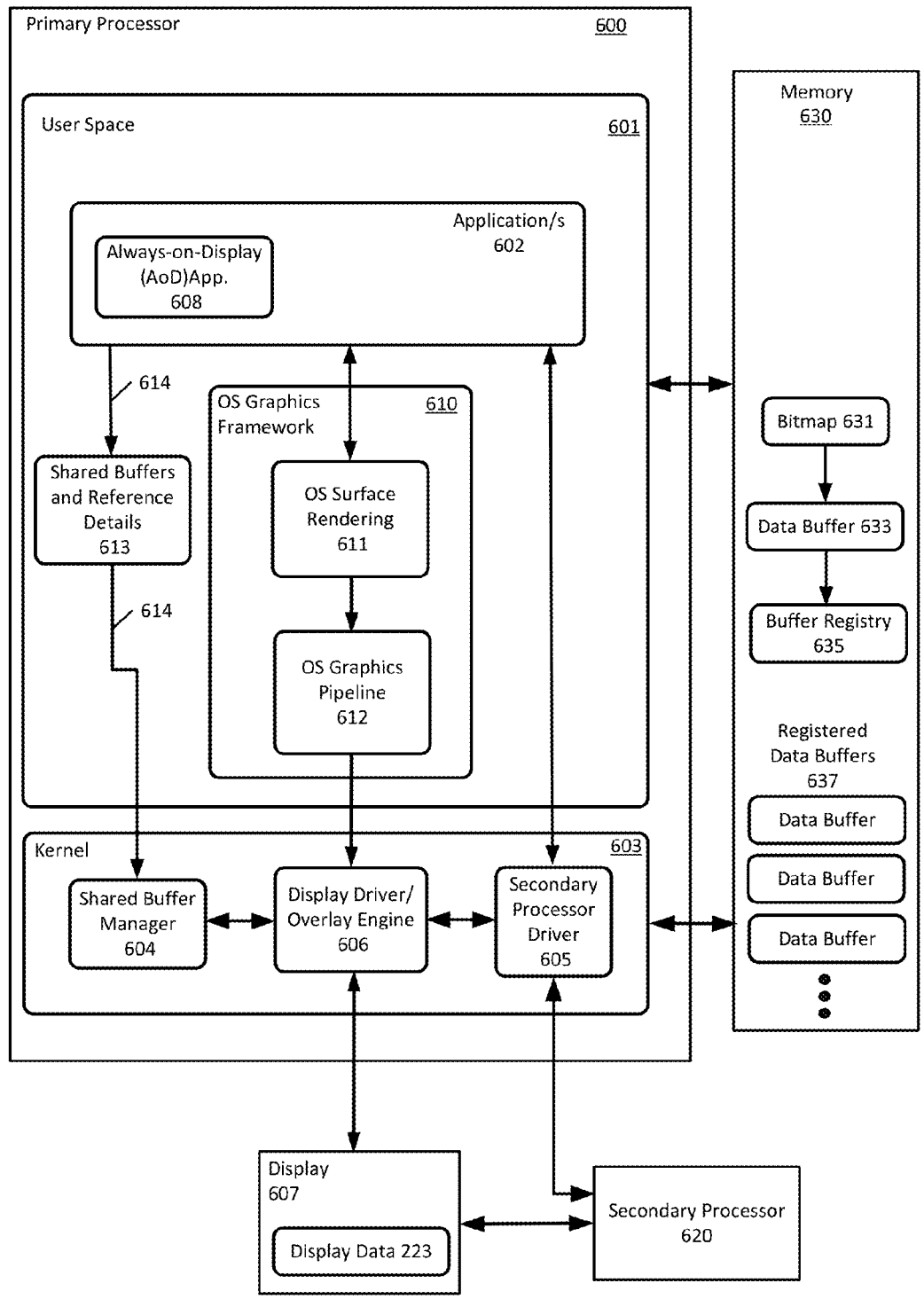
FIG. 6 is block diagram of an example electronic device in accordance with an embodiment having a primary processor and a secondary processor in which the secondary processor is configured to substitute for a graphics application of the primary processor user space to control a display.

Turning to FIG. 6, another example apparatus in accordance with one embodiment is shown. A primary processor 600 is operatively coupled to a secondary processor 620 and to a display 607. The secondary processor 620 is also operatively coupled to the display 607. In the embodiment of FIG. 6, the secondary processor 620 is operative to communicate with the kernel 603 to substitute for one or more applications, of applications 602 within the user space 601 of the primary processor 600, to perform hardware operations such as updating display data 223 on the display 607. The user space 601 includes one or more applications 602, a "Draw" API (which may include one or more APIs) and an OS graphics framework 610. The OS graphics framework 610 includes an OS surface rendering module 611 and an OS graphics pipeline 612. The kernel 603 includes a shared buffer manager 604, a display driver/overlay engine 606 and secondary processor driver 605. The Draw API 614 provides shared buffer and reference details 613 to the shared buffer manager 604 and this information is used during a Draw operation.

An electronic device in accordance with the various embodiments may employ, for example, the Android™ OS executing on the primary processor. However any of various operating systems may be used in accordance with the embodiments, such as, but not limited to, Android™, Linux®, Ubuntu®, etc. One example of an OS graphics pipeline 612 for embodiments using the Android™ OS is "Surfaceflinger." The embodiment illustrated in FIG. 6 may be used to implement a Peek operation as was described above. A Peek operation in the various embodiments may be implemented as a message driven state machine between the secondary processor 620, the secondary processor driver 605, and the display driver/overlay engine 606. One example of the display driver/overlay engine 606 in an Android™ OS kernel is the msm_fb driver. Operational details of a message driven state machine are described in further detail with respect to the flowchart of FIG. 9 which is described in detail further below.

In operation, the primary processor 600 and, correspondingly, the user space 601 and kernel 603 may operate in a suspend mode to conserver power. In accordance with the embodiments, a Peek operation may be invoked by a user providing user input to a touchscreen input of display 607. In response to the touchscreen input, a wake-up signal is generated. However, for a Peek operation, the kernel 603 will only resume "resume_early" drivers including the secondary processor driver 605 and the display driver/overlay engine 606.

In accordance with the example embodiment of FIG. 6, a Peek operation involves a user space 601 application's utilization of off-screen buffers rather than pushing frames using the OS graphics framework 610. As various notifications come in, an Always-on-Display ("AoD") application 608 for example, may create buffers and inform the kernel 603, and maintain the primary processor 600 in a sleep mode while the secondary processor 620 will take over and interact with the kernel 603 to draw the buffer when needed for the Peek operation.

A Peek operation may occur while the primary processor 600 is in the sleep mode or is awake. The creation of off-screen buffers may be one type of event that causes a wake up command to be sent. When the primary processor 600 is awake, the secondary processor 620 may be operated in a sleep mode. For example, when the primary processor 600 is awake, a Peek operation may invoke a Draw operation. The Draw operation may create one or more off-screen buffers which would case the primary processor 600 to wake the secondary processor 620. That is, the secondary processor 620 may be woken up by a message from the primary processor 600 (i.e. a "buffers are created" message).

In another possible scenario, the primary processor 600 may be awake however the display 607 may be off. In that case, the secondary processor 620 may still send a wake trigger (even though the primary processor is already awake) such that the secondary processor 620 may send a Peek command message outside of a Wake operation. In other words, the various embodiments may perform a Peek operation even when the primary processor 600 is performing some other activity. In either scenario however, a buffer must be registered by the application to the kernel prior to any actions by the secondary processor 620. In the various embodiments, such buffers are not sent to the display 607 but instead are stored in the memory 630 until the buffers are needed by a Draw command.

In operation of existing systems, one of the applications 602 would create a "view" which is a buffer that the OS graphics framework 610 would compose into a surface. The surface would be processed through the OS graphics pipeline 612 and placed on the display 607 by the display driver/overlay engine 606. In contrast, in the various embodiments, the buffer is not processed through the OS graphics framework 610 but instead is generated as an "off screen" buffer to be used at a later time. For example, the data buffer 633 is stored in memory 630, and registered with the kernel 603 such that it is referenced in the buffer registry 635 (and becomes one of the registered data buffers 637) for later identification and access. In the various embodiments, buffer registration operations are performed by Draw API 614. That is, the application 608 extracts a view from one of the other applications 602 and utilizes the Draw API 614 to place it in the data buffer 633 and register the data buffer 633 with the kernel 603. The kernel 603 then lists the data buffer 633 in the buffer registry 635.

The memory 630 is operatively coupled to the user space 601 and to the kernel 603 and is readable and writable by both. The memory 630 may be an on-board memory of the primary processor 600 chip, or may be an external memory component or may be implemented as virtual memory in some embodiments.

Figure 7:
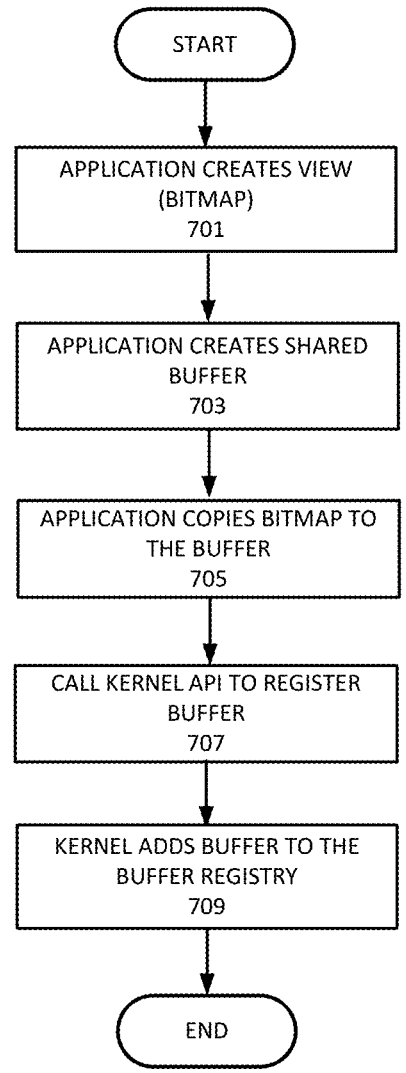
FIG. 7 is a flowchart showing a method of operation for buffer registration in accordance with various embodiments.

FIG. 7 is a flowchart showing a method of operation for buffer registration in accordance with various embodiments. The method of operation begins, and in operation block 701 one of the applications 602 creates a view (i.e. a bitmap). In operation block 703, the view is extracted by the Draw API 614. The application copies the view to the data buffer 633 in operation block 705 and it is stored in memory 630. In operation block 707, a kernel 603 API is called to register the data buffer 633, and the kernel 603 registers the data buffer 633 in the buffer registry 635 as shown in operation block 709. The method of operation then ends.

As mentioned above, the Draw API 614 may include one or more APIs that provide an input/output control ("IOCTL") interface to the kernel 603 to enable an application to use the kernel 603 and the secondary processor 620. An example implementation of such an IOCTL interface having various APIs will now be described with respect to one example embodiment in which an "Always-on-Display" ("AoD") application 608 makes use of the kernel 603 and secondary processor 620. More particularly, the AoD application 608 uses the various APIs, along with the protocol 405 which was described above, in creating a control register sequence for Peek operations described with respect to FIG. 2A and FIG. 2B.

Therefore, in accordance with the example embodiment under discussion, the Draw API 614 may provide a suite of various APIs for interfacing between one of the applications 602 and the kernel 603. As an example API, a "DRAW_INIT" API is called when the AoD application 608 starts to clear out any "stale" buffers in the memory 630. A "DRAW_ADD_BUFFER" API is used when a new peek view is created and which must be registered with the kernel 603. The new peek view is "peekable" by way of a secondary processor 420 request. The DRAW_ADD_BUFFER API may provide a payload "struct msmfb_draw_buffer_data" which may be a bitmap 631 of the peek view that is to be placed in a data buffer such as data buffer 633. A "DRAW_REMOVE_BUFFER" API may be used when a peek view (i.e., for example, the bitmap 631) is no longer needed and is to be unregistered from the kernel 603 (such that it is no longer "peekable"). The API would send the corresponding buffer ID so that the data buffer can be removed from the buffer registry 635 and also therefore, from the registered data buffers 637.

A "DRAW_LOCK_BUFFER" API may be used when the buffer contents are being updated. This API is to be called before the updated bitmap 631 is copied to the input/output memory management unit "IOMMU" (not shown) prior to being written to memory 630. The payload for the API is the corresponding buffer ID for the buffer to be updated. A "DRAW_UNLOCK_BUFFER" API is used to unlock a previously locked buffer after the bitmap has been copied to the IOMMU. The payload for this API is also the buffer ID for the (now updated) buffer. Other APIs may also be present and the APIs are not limited in any way to the examples provided herein. These example APIs are provided as one possible implementation of the Draw API 614 in accordance with one example embodiment and with respect to one example application (i.e. AoD application 608).

In accordance with the embodiments, the example AoD application 608 creates a "look and feel" of a "peek" and uses the kernel 603 and the secondary processor 620 as tools to render the peek, and corresponding animations, in response to user interaction with the display panel. The secondary processor 620 is used to execute the control of a register sequence defined by the AoD application 608. The kernel 603 is used by the secondary processor 620 to draw the off-screen data buffers (from the registered data buffers 637 that are associated with a peek) to the display 607 memory (display data 223) according to the control register sequence.

An example will now be described of a particular sequence that the AoD application 608 may take in management of the off-screen buffers that make up different peek views (i.e. registered data buffers 637). The sequence for an application more generally was described with respect to FIG. 7. In the current example, the AoD application 608 may start by calling the DRAW_INIT API of the IOCTL interface to reset the kernel 603 off-screen buffer list, i.e. buffer registry 635 which corresponds to registered data buffers 637. For each new off-screen buffer that the AoD application 608 wants to manage the application may call the DRAW_ADD_BUFFER API of the IOCTL interface to register an off-screen buffer with the kernel 603. These buffers (registered data buffers 637) may, in some embodiments, be kept registered for the lifetime of the AoD application 608 as continual removal and addition of buffers can result in fragmentation of the memory 630.

When one of the previously registered off-screen buffers of registered data buffers 637 needs to be updated, the buffer must be locked using for example the DRAW_LOCK_BUFFER API, updated, and then unlocked using the DRAW_UNLOCK_BUFFER API. When the AoD application 608 exits or when a feature corresponding the the AoD application (i.e. an "always-on" display feature) is disabled, all off-screen registered data buffers 637 are removed using the DRAW_REMOVE_BUFFER API of the IOCTL interface.

In implementation of the above described APIs, a data structure is also defined to store information associated with a peek within the user space 601. In one example, the data structure includes, but is not limited to or restricted by, buffer data ("msmfb_draw_buffer_data") (for example, bitmap 631 and other information for a peek); a buffer ID ("buffer_id") which is a unique buffer ID to identify the buffer between user space 601, the kernel 603, and the secondary processor 620; a file descriptor ("user_fd") to the IOMMU allocated memory space; and an overlay structure ("mdp_overlay") that contains the starting x-y coordinates and the peek's width and height.

The kernel 603 and the secondary processor 620 cannot communicate with the display 607 at the same time. Further details of how communication with the display is handed off from a kernel to a secondary processor, and creation of the control register sequence in accordance with various embodiments is described further in FIG. 9 which is discussed herein below.

Based on the above description and as shown in FIG. 6, the various embodiments enable an application to generate and maintain multiple "peek views" that are registered with the kernel 603 and with the secondary processor 620 so that when a user peeks at an "inactive" notification on the display 607, the secondary processor 620 can request the kernel 603 to draw the peek to the display 607 using a Peek operation.

Among other advantages, an application does not need to access the OS Graphics Framework 610 to render a "peek" and also does not have to generate a single full-screen "peek" with each notification. Instead, each notification may correspond to its own view which may further correspond to a single off-screen data buffer, in the registered data buffers 637, which may be accessed and written to the display data 223 as needed in response to the user's touch. Furthermore, among other advantages, the primary processor need not come out of full suspend to a fully resumed state to allow the OS to render the "peek" through the OS Graphics Framework 610. Therefore, the various embodiments save processing time and increase mobile device responsiveness, as well as reduce current consumption by the primary processor 600 thereby increasing battery usage time.

Therefore, in operation, when a user touches an area of the display 607 in order to "peek" at an "inactive" notification, the secondary processor 620 will notify the kernel display driver/overlay engine 606 that a peek (via the peek's buffer ID) needs to be drawn to the display 607 using the Peek operation as described above. The kernel display driver/overlay engine 606 will render the appropriate data buffer (from the registered data buffers 637) to the display panel's memory (i.e. display data 223) and then return control back to the Secondary processor 620 for further user interaction.

The following pseudo code provides an example of generating an off screen peek buffer. In the example, the bitmap 631 is copied to the data buffer 633 that is passed to the kernel 603 via the DRAW_ADD_BUFFER API. As notifications are added and removed the data buffer 633 can be rewritten and subsequently rewritten to the display 607 display data 223.

Java App Code Segment:

```
// inflate the xml layout into a view
// restricting the size to the size of the peek view
View v = inflate(R.id.peek_content);
v.measure(width, height);
v.layout(x,y,width,height);
// render the layout into a offscreen
Bitmap
Bitmap.Config conf = Bitmap.Config.RGB_888;
Bitmap bmp = Bitmap.createBitmap(width, height, conf);
Canvas c = new Canvas(bmp);
v.draw(c);
// create the IOMMU buffer in native code and
// register it with the kernel
createPeekBuffer(bmp);
```

Java Native Code Segment:

```
createPeekBuffer( ):
int ret;
void *mem_buf;
uint8_t *pixels;
uint8_t *dst_pixels;
AndroidBitmapInfo bmpInfo;
AndroidBitmap_getInfo(env, bmp, &bmpInfo);
mem_buf = allocateIonBuffer(bmpInfo.w, bmpInfo.h);
dst_pixels = reinterpret_cast<uint8_t*>(mem_buf);
/* Copy the bitmap into the ION buffer */
ret = AndroidBitmap_lockPixels(env, bmp, &pixels);
if (ret == ANDROID_BITMAP_RESULT_SUCCESS) {
memcpy(dst_pixels, pixels, bmpInfo.w * bmpInfo.h * 2);
ret = AndroidBitmap_unlockPixels(env, bmp);
```

-continued

```
/* Send this buffer to draw */
// do this AFTER memcpy to ensure the image data
// is already transferred when the buffer is added
int fb_fd = open("/dev/graphics/fb0", O_RDWR, 0);
// This takes the qd_buffer_data which is filled out in
// allocateIonBuffer( ) and needs to be available here
ioctl(fb_fd, MSMFB_DRAW_ADD_BUFFER, &qd_buffer_data);
close(fb_fd);
}
allocateIonBuffer(w, h):
int bufferSize, page_size = sysconf(_SC_PAGESIZE);
struct ion_fd_data fd_data;
struct ion_allocation_data ionAllocData;
static void *mem_buf = NULL;
int ion_fd, ret;
struct msmfb_draw_buffer_data qd_buffer_data;
bufferSize = w * h * 2; // RGB_888
bufferSize = (bufferSize + page_size 1)
& (~(page_size 1))
;
ionAllocData.len = bufferSize;
ionAllocData.align = page_size;
ionAllocData.heap_mask =
ION_HEAP(ION_IOMMU_HEAP_ID) |
ION_HEAP(ION_CP_MM_HEAP_ID) |
ION_HEAP(ION_CP_WB_HEAP_ID) |
ION_HEAP(ION_SF_HEAP_ID);
ionAllocData.flags = 0;
ion_fd = open("/dev/ion", O_RDWR);
ioctl(ion_fd, ION_IOC_ALLOC, &ionAllocData);
fd_data.handle = ionAllocData.handle;
ioctl(ion_fd, ION_IOC_SHARE, &fd_data);
mem_buf = mmap(NULL, bufferSize,
PROT_READ | PROT_WRITE, MAP_SHARED, fd_data.fd, 0);
close(ion_fd);
qd_buffer_data.buffer_id = bufferID;
qd_buffer_data.user_fd = fd_data.fd;
qd_buffer_data.overlay.src.width = w;
qd_buffer_data.overlay.src.height = h;
qd_buffer_data.overlay.src.format = MDP_RGB_888;
qd_buffer_data.overlay.src_rect.x = 0;
qd_buffer_data.overlay.src_rect.y = 0;
qd_buffer_data.overlay.src_rect.w = w;
qd_buffer_data.overlay.src_rect.h = h;
qd_buffer_data.overlay.dst_rect.x = x;
qd_buffer_data.overlay.dst_rect.y = y;
qd_buffer_data.overlay.dst_rect.w = x+w;
qd_buffer_data.overlay.dst_rect.h = y+h;
qd_buffer_data.overlay.z_order = 0;
qd_buffer_data.overlay.alpha = 0xff;
qd_buffer_data.overlay.flags = 0;
qd_buffer_data.overlay.is_fg = 0;
qd_buffer_data.overlay.id = MSMFB_NEW_REQUEST;
```

Figure 8:
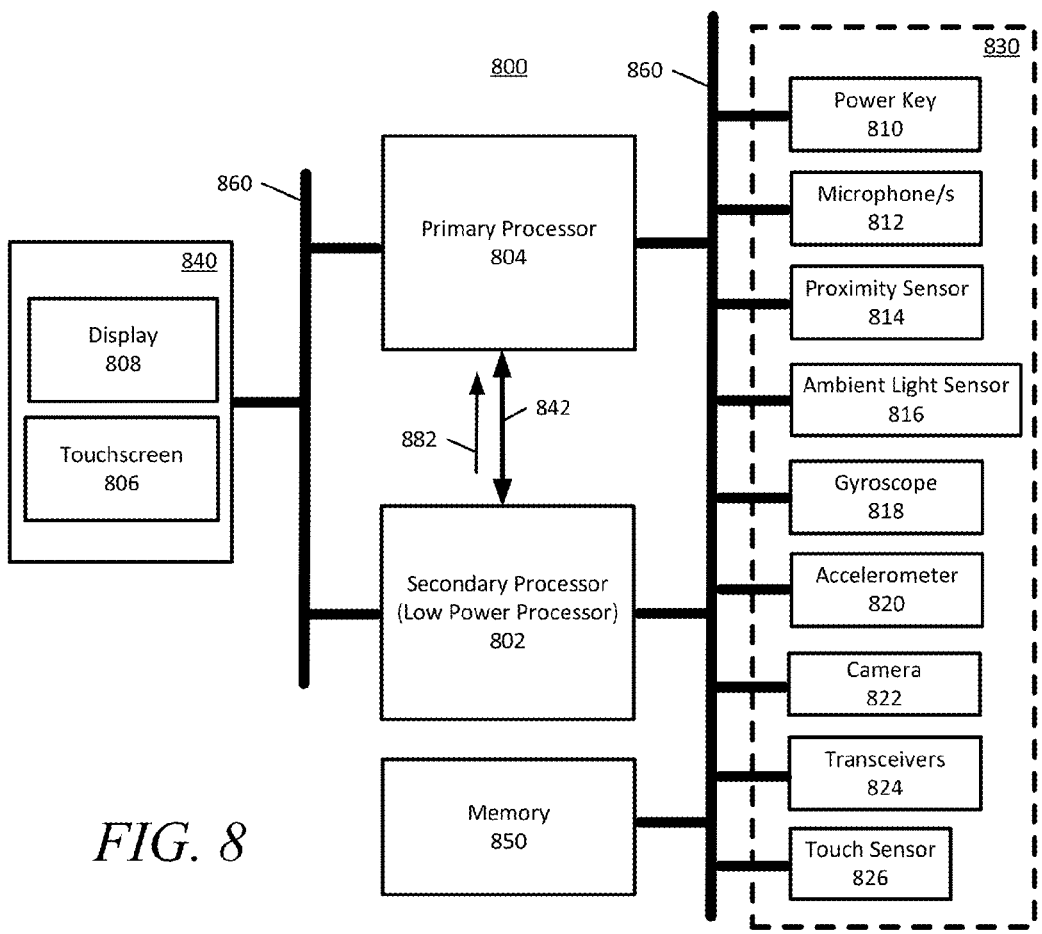
FIG. 8 is a block diagram of an electronic device in accordance with one embodiment of the present disclosure.

FIG. 8 is a block diagram of an example electronic device 800 in accordance with one embodiment of the present disclosure. The example electronic device 800 is a mobile phone, i.e. a smartphone. However an electronic device in accordance with the embodiments may be any of various suitable electronic devices such as, but not limited to, a mobile phone (i.e. a smartphone); a personal digital assistant (PDA); a portable media player (e.g., an MP3 player); a personal computing device, such as a tablet; or a wearable electronic device, such as those worn with a wristband (i.e. a smartwatch). That is, an electronic device in accordance with the embodiments may be any electronic device that is capable of operating in a sleep mode. The electronic device 800 is configured to perform the operations, and to provide features and functions, as described above with respect to FIG. 1A, FIG. 1B, FIGS. 2A through 2C, FIG. 4, FIG. 6 and the above described flowcharts.

One or more connection buses 860 provide operative coupling between a primary processor 804, a secondary processor 802 (low power processor) and other various electronic device 800 components. As used herein, components may be "operatively coupled" when information can be sent between such components, even though there may be one or more intermediate or intervening components between, or along the connection path. Therefore, any of the various components connected to the one or more connection buses 860 may be understood herein to be operatively coupled to the primary processor 804, to the secondary processor 802, or some other component, etc. where appropriate.

A connection bus 842 provides operative coupling between the primary processor 804 and the secondary processor 802. The connection bus 842 may be, for example, an Inter-Integrated Circuit (I²C) bus in some embodiments. However, the connection bus 842 may be implemented using other suitable connection technologies such as, but not limited to, Serial Peripheral Interface (SPI), Universal Asynchronous Receiver/Transmitter (UART), controller area network (CAN), or by using portpins in some embodiments, or using some other suitable connection technology.

The memory 850 represents both read only memory (ROM) and random access memory (RAM) within the electronic device 800. Although the memory 850 is shown as a single component, at least the RAM portion of the memory may be a distributed memory that is distributed among various components within the electronic device 800. More particularly, the RAM portion of memory 850 is may be used by the primary processor 804 and secondary processor 802 to implement virtual memory features. The ROM portion of the memory 850 is a non-volatile, non-transitory memory, and stores executable instructions (executable code) or data that may be accessed and executed by the primary processor 804 or by the secondary processor 802.

The electronic device 800 includes a display component 840 and sensors and UI 830. The display component 840 may be referred to as a "touchscreen display." The display component 840 includes a display 808 (i.e. a display that shows information to the user) and a touchscreen 806 (i.e. touch sensors or a touch matrix positioned to receive user input by touching the display 808 at specific locations). The display component 840 is operatively coupled to the primary processor 804 and to the secondary processor 801 by the one or more connection buses 860.

The sensors and UI 830 are also operatively coupled to the primary processor 804 and to the secondary processor 801 by the one or more connection buses 860. The sensors and UI 830 include a power key 810 (i.e. an on/off button), one or more microphones 812 (such as a microphone array) and one or more speakers (not shown). The one or more microphones 812 are also operatively coupled to audio processing logic (not shown) that may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio received using the one or more microphones 812. The sensors may include, but are not limited to, a proximity sensor 814, ambient light sensor 816, gyroscope 818 and accelerometer 820. The electronic device 800 may also include a camera 822, one or more transceivers 824 and a touch sensor 826 which may be positioned on a side or back portion or on some other suitable location of the electronic device 800.

The transceivers 824 may provide wireless communication capabilities for one or more wide area network communications systems such as, but not limited to, cellular, 2G, 3G or 4G wireless communications systems and may also provide Internet connectivity over a wireless interface. In some embodiments, a second wireless transceiver may provide wireless connectivity capabilities such as, but not limited to, Wi-Fi™ Bluetooth™, Wireless USB™, Zig-Bee™, or other technologies, etc., and may also provide Internet connectivity over any of these wireless interfaces.

The sensors and UI 830 may provide signals (sensor data or command and control signals) to the primary processor 804 or to the secondary processor 802 during various modes of operation of the electronic device 800. The display component 840 touchscreen 806 may also be considered to be a part of the user interface, and the display 808 may provide a graphical user interface (GUI) related to an electronic device 800 operating system, a GUI related to one or more applications, etc.

When the primary processor 804 operates in sleep mode, any of the components of the sensors and UI 830, or the touchscreen 806, may send a wake up command, using the one or more connection buss 860, to the primary processor 804 to cause it to wake up. The secondary processor 802 may send the wake up command 882 over the connection bus 842.

Figure 9:
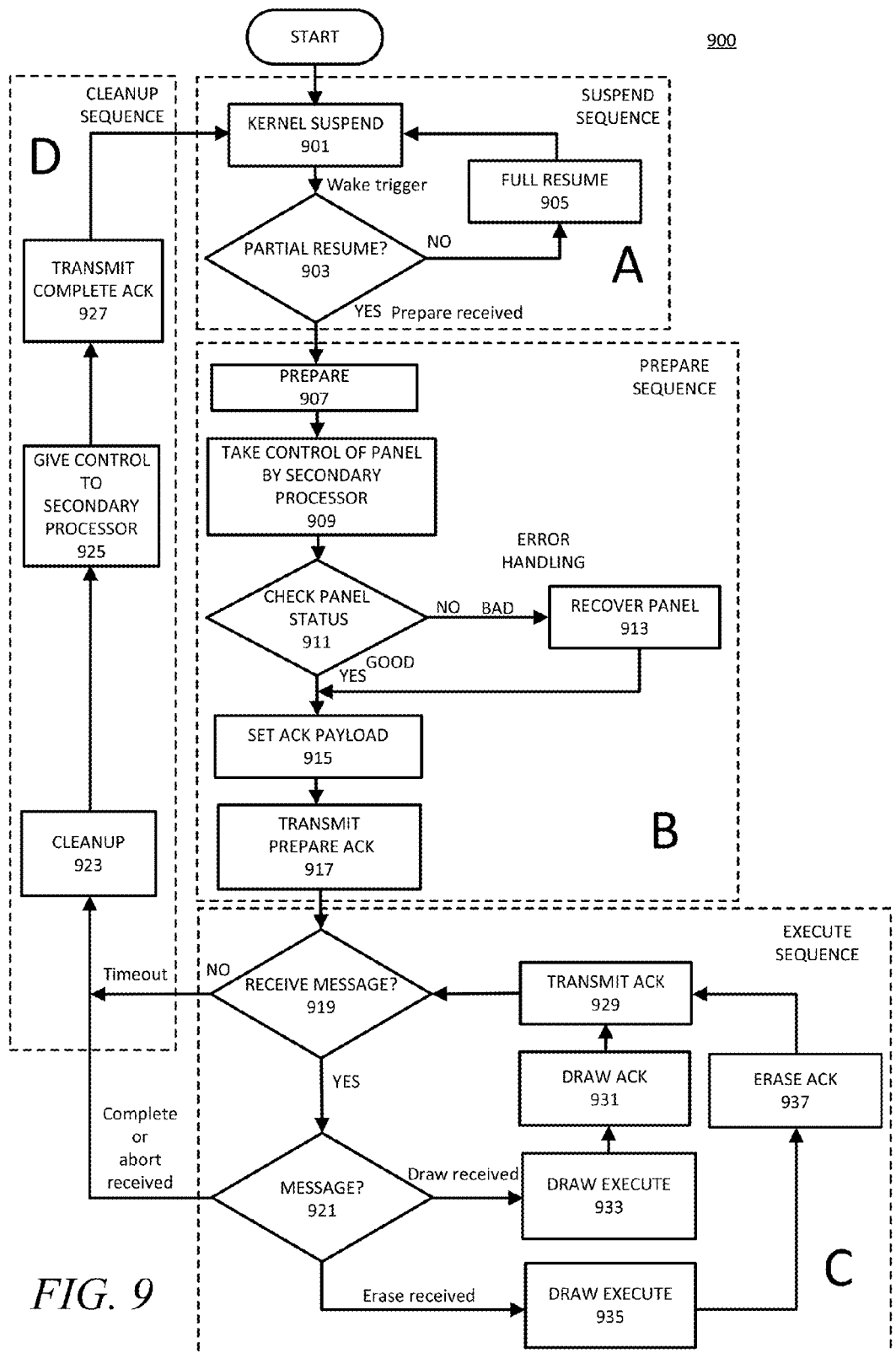
FIG. 9 is a flowchart showing a method of operation of an electronic device in accordance with some embodiments.

FIG. 9 is a flowchart showing a method of operation of an electronic device in accordance with some embodiments. Referring to FIG. 9 and also to FIG. 6, a Peek operation is illustrated as a message driven state machine between the secondary processor 620, the secondary processor driver 605, and the display driver/overlay engine 606 (which may also be referred to as a "display driver"). The state machine includes four stages of functionality: a suspend sequence; a prepare sequence; an execute sequence; and a cleanup sequence.

Beginning with the suspend sequence, the process 900 may begin in response to an event such as, but not limited to, generate of an off-screen data buffer such as data buffer 633. When the primary processor 600 is in a fully suspended state, the electronic device is placed in an extremely low power mode as shown in operation block 901. The state of the secondary processor 620 may be unknown. The primary processor 600 including the kernel 603 are dormant and in a sleep state.

In decision block 903, a "wake trigger" may be detected. A "wake trigger" (also referred to herein as a "wake up command") may occur for various reasons and may be sent from any of various sensors or UI inputs (such as sensors and UI 830 shown in FIG. 8). When a wake up command is detected, a check is performed in decision block 903 to determine the reason for the wake up command.

The check involves waking the kernel 603 primary processor 600 so that a Wake_Status engine can check the reason for the wake up command. If the wake up command did not emanate from the secondary processor 620, then the process 900 proceeds to operation block 905 and performs a full resume of the primary processor 600 which also wakes up the user space 601. The Wake_Status engine in the kernel 603 checks a communication port from the secondary processor 620 for a message indicating a Peek operation. If this message is not present the full resume is performed in operation block 905. The message may be a Prepare message as shown in operation block 907.

Subsequent to the full resume in operation block 905, the primary processor 600 may go back to the suspend mode in operation block 901 at any time after the primary processor 600 has handled the reason for the wake up command. Returning to operation block 907, the Wake_Status engine in the kernel 603 is now notified that a Draw operation is being requested. The secondary processor 620 is then handed control of the display 607 in operation block 909 and takes control. In one example, this may be accomplished by controlling access to the switch 108 of the display 107 as shown in FIG. 1B such that either the kernel 103 or the secondary processor 120 controls the display 107 at any one time. Returning to FIG. 9, an error handling procedure for the display 607 is performed in decision block 911 and operation blocks 913, 915 and 917.

The display 607 status is checked in decision block 911 to validate that the secondary processor 620 can communicate with the display 607. If a problem exists, the display 607 is recovered in operation block 913. That is, in operation block 913, the secondary processor 620 and display 607 are synchronized if needed. After decision block 911, and any needed corrective action in operation block 913, the process 900 proceeds to operation block 915. In operation block 915, an acknowledgement message that acknowledges the Draw prepare message is constructed and, in operation block 917, the acknowledgment message is sent to the secondary processor 620.

In decision block 919, the execute sequence begins and the secondary processor 620 waits to receive the acknowledgment message. If the acknowledgment message is not received by the secondary processor 620 prior to a timer timeout, the process 900 proceeds to the cleanup sequence beginning with operation block 923. The timer timeout length in decision block 919 may be on the order of about 5 seconds. The purpose of the timer is so that the primary processor 600 does not get stuck waiting forever in the event secondary processor 620 has a problem.

In the cleanup sequence, control of the display 607 is handed back to the secondary processor 620 in operation block 925 so that it may undo certain variables (i.e. "cleanup"). Other clean up actions may include turning off a Mobile Industry Processor Interface (MIPI) or switching the MIPI over to the secondary processor 620 to control the display 607, turning off display drivers including the kernel 603 display driver/overlay engine 606, and suspending the kernel 603 engine. The display 607 however, will not be placed in a sleep mode at this point. In operation block 927, a "Complete" acknowledgement message is sent from the primary processor 600 to the secondary processor 620, the purpose of which is to inform the secondary processor 620 that it has control of the display 607 per completion of operation block 925. At this point, the process 900 ends and a new process must be started if needed.

Returning to the execute sequence and to decision block 919, receipt of the acknowledgement message in decision block 919 leads to decision block 921 in which the primary processor 600 waits for a message from the secondary processor 620 which represents a handshaking routine. In decision block 921, the secondary processor 620 may send one of a "Draw," "Erase," or "Complete" command. Upon the primary processor 600 receiving a command message in decision block 921, the primary processor 600 first determines the command type (i.e. "Draw," "Erase," or "Complete"). If a "Draw" command is received in decision block 921, the process 900 proceeds to operation block 933 and executes the Draw command. In operation block 931, a Draw acknowledgement message is generated and sent. The primary processor 600 will then wait in decision block 919 for either another command or for a timeout condition. If an "Erase" command is received in decision block 921, the process 900 proceeds to operation block 935 and executes a Draw command, however the functions of operation block 933 and operation block 935 are different with respect to the display data modification. That is, in order to implement an Erase command, the display 607 coordinates are obtained and a black rectangle is drawn to "erase" that portion of the display 607. The primary processor 600 performs the necessary function calls to cause the messages to be sent to the display 607 over the MIPI lines to cause the display 607 to draw the black rectangle in the appropriate location. Thus as can be seen from the process 900, the Draw operation is utilized by the secondary processor driver 605 during a Peek operation.

In operation block 937, an Erase acknowledgment is generated and is sent by the primary processor 600 to the secondary processor 620 when the black box or rectangle is drawn such that the requested "Erase" command execution is completed. Likewise, for a "Draw" command, a draw acknowledgment is sent by the primary processor 600 to the secondary processor 620 when the object is drawn such that the requested "Draw" command execution is completed. In operation block 929, the secondary processor 620 acknowledges either the Erase acknowledgement or the Draw acknowledgement as appropriate.

Operation block 933 includes identification of a Peek draw payload which is a buffer that needs to be drawn. For example, the data buffer 633 is drawn to the display 607 in operation block 933. Therefore, the Peek draw command includes communication of the relevant buffer identification. In the various embodiments, applications 602 create the buffers, generate the buffer IDs, and inform the kernel 603 about the buffer. The secondary processor 620 therefore has knowledge of which of the applications 602 generated the data buffer 633.

Returning again to the suspend sequence of process 900, for the operations occurring below decision block 903, although the primary processor 600 is operating, the full resume 905 is not performed such that the entirety of the user space 601 has not been activated. More specifically, the operations occurring below decision block 903 take only a fraction of the time it takes to perform the full resume of operation block 905. In other words, the full resume 905 wakes up all of the applications 602 of the user space 601. In further operation, the process 900 can be invoked by suspending the primary processor 600 again at any time when appropriate to do so based on the state of the application.

One embodiment of the present disclosure may be a computer readable, non-volatile, non-transitory memory that stores executable instructions for execution on at least one processor. The instructions, when executed, cause the at least one processor to perform the various methods of operation and corresponding features and functions described in detail above.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
registering, by a first processor of an electronic device, a graphics buffer with a kernel executed by the first processor, the kernel comprising a display driver;
storing, by the first processor, the registered graphics buffer in a memory without outputting the graphics buffer for display;
while the first processor is in a sleep mode, receiving, by the first processor and from a second processor of the electronic device, a wake command;
responsive to receiving the wake command, performing, by the first processor, at least a partial resume of the kernel while preventing an activation of a user space accessed by the first processor; and
responsive to receiving a command associated with the registered graphics buffer from the second processor, outputting, by the first processor using the display driver of the kernel, and for display, the graphics buffer without using an operating system graphics pipeline of the user space.

2. The method of claim 1, further comprising:
informing, by the first processor, the second processor of the registered graphics buffer that is stored in the memory.

3. The method of claim 1, further comprising:
receiving, by an application executing in the user space, a graphics buffer creation trigger; and
responsive to receiving the graphics buffer creation trigger, registering the graphics buffer with the kernel.

4. The method of claim 3, wherein receiving the graphics buffer creation trigger comprises:
receiving, by the application executing in the user space, the buffer creation trigger in response to a notification message that is related to the graphics buffer.

5. The method of claim 1, wherein the command associated with the registered graphics buffer comprises a draw command that includes buffer identification information for the registered graphics buffer.

6. The method of claim 1, further comprising:
receiving, by the kernel executed by the first processor, and from the second processor, an erase command that includes buffer identification information for a graphics buffer containing a black geometric shape; and
outputting, by the first processor using the display driver of the kernel, and for display, the black geometric shape at an area in order to erase the area from display.

7. The method of claim 1, wherein receiving the wake command from the second processor comprises receiving, by the first processor and from the second processor, the wake command in response to the second processor detecting a user input a touchscreen display, the user input selecting a notification message.

8. An apparatus comprising:
a display;
a non-transitory memory;
a primary processor; and
a secondary processor,
wherein the primary processor and the secondary processor are each operatively coupled to the non-transitory memory, and
wherein the primary processor is configured to:
execute a kernel comprising a display drive;
execute a user space comprising one or more applications, the user space operative to register a graphics buffer with the kernel;
store the registered graphics buffer in the non-transitory memory without outputting the graphics buffer for display;
while the primary processor is in a sleep mode, receive, from the secondary processor of the apparatus, a wake command;
responsive to receiving the wake command, perform at least a partial resume of the kernel while preventing an activation of the user space; and
responsive to receiving a command associated with the registered graphics buffer from the secondary processor, output, using the display driver of the kernel, and for display, the graphics buffer without using an operating system graphics pipeline of the user space.

9. The apparatus of claim 8, wherein the primary processor is further configured to:
inform the secondary processor of the registered graphics buffer.

10. The apparatus of claim 8, wherein the primary processor is further configured to:
receive, by a first application executing in the user space, and from a second application executing in the user space, a graphics buffer creation trigger; and
register, by the first application, the graphics buffer with the kernel.

11. The apparatus of claim 10, wherein the first application is further configured to receive the graphics buffer creation trigger in response to a notification message that is related to the graphics buffer.

12. The apparatus of claim 8, wherein the command associated with the registered graphics buffer comprises a draw command that includes buffer identification information for the registered graphics buffer.

13. The apparatus of claim 8, wherein the primary processor is further configured to:
receive, by the kernel and from the secondary processor, an erase command that includes buffer identification information for a graphics buffer stored in the non-transitory memory and containing a black geometric shape; and
output, using the display driver of the kernel, and for display, the black geometric shape at an area of the display in order to erase the area.

14. The apparatus of claim 8, wherein the display is a touchscreen display, and wherein the primary processor is configured to receive the wake command in response to the secondary processor receiving an indication of a user input detected at the touchscreen display, the user input selecting a notification message.

15. An apparatus comprising:
a touchscreen display;
a non-transitory memory;
a primary processor configured to execute a kernel and a user space comprising one or more applications, the kernel comprising a display driver, and the user space operative to register a graphics buffer with the kernel; and
a secondary processor,
wherein the primary processor and the secondary processor are each operatively coupled to the non-transitory memory, and
wherein the secondary processor is configured to:
receive an indication of a user input detected at the touchscreen display to select a notification;
responsive to receiving the indication of the user input, and while the primary processor is in a sleep mode, send a wake command to the primary processor to initiate at least a partial resume of the kernel while preventing an activation of the user space; and
pass the registered graphics buffer to the display driver of the kernel.

16. The apparatus of claim 15, wherein the secondary processor is further configured to:
receive, from the primary processor, an indication of the registered graphics buffer.

17. The apparatus of claim 15, wherein the secondary processor is further configured to:
send, to the primary processor, an erase command that includes buffer identification information for a graphics buffer stored in the non-transitory memory and containing a black geometric shape.

18. The apparatus of claim 15, wherein the secondary processor is configured to send the wake command to the primary processor in response to receiving an indication of a user input detected at the touchscreen display, the user input selecting a notification message.

* * * * *

UNITED STATES PATENT AND TRADEMARK OFFICE
CERTIFICATE OF CORRECTION

PATENT NO. : 9,753,527 B2  
APPLICATION NO. : 14/339962  
DATED : September 5, 2017  
INVENTOR(S) : Nathan M. Connell et al.

Page 1 of 1

It is certified that error appears in the above-identified patent and that said Letters Patent is hereby corrected as shown below:

In the Claims

Column 24, Line 53 (Claim 8): Replace "execute a kernel comprising a display drive;" with --execute a kernel comprising a display driver;--

Signed and Sealed this  
Ninth Day of October, 2018

Andrei Iancu  
*Director of the United States Patent and Trademark Office*